United States Patent
Bagajewicz

(10) Patent No.: US 8,075,786 B2
(45) Date of Patent: Dec. 13, 2011

(54) ACOUSTIC/PRESSURE WAVE-DRIVEN SEPARATION DEVICE

(75) Inventor: Miguel J. Bagajewicz, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 1089 days.

(21) Appl. No.: 11/850,439

(22) Filed: Sep. 5, 2007

(65) Prior Publication Data

US 2008/0053787 A1 Mar. 6, 2008

Related U.S. Application Data

(60) Provisional application No. 60/842,332, filed on Sep. 5, 2006.

(51) Int. Cl.
*C02F 1/32* (2006.01)
*C10G 9/18* (2006.01)
*C10G 31/06* (2006.01)

(52) U.S. Cl. ......... 210/748.05; 210/748.01; 210/748.02; 422/20; 422/128

(58) Field of Classification Search ............. 210/748.01, 210/748.02, 748.05; 422/22, 24, 20, 128; 196/111; 208/308
See application file for complete search history.

(56) References Cited

U.S. PATENT DOCUMENTS 2,964,124 A 12/1960 Peierls et al.
(Continued)

FOREIGN PATENT DOCUMENTS

WO WO 2006/095117 9/2006
(Continued)

OTHER PUBLICATIONS

S. II, K. Matsuura, T. Fukazu, M. Toki and F. Kawaizumi, "A Novel Method to Separate Organic Compounds Through Ultrasonic Atomization," 2006 Institution of Chemical Engineers, Trans IchemE, Part A, May 2006, *Chemical Engineering and Design*, 84(A5): pp. 412-415.

(Continued)

*Primary Examiner* — Nam Nguyen
*Assistant Examiner* — Cameron J Allen
(74) *Attorney, Agent, or Firm* — Dunlap Codding, P.C.

(57) ABSTRACT

An acoustic/pressure wave-driven device for separating a first component from a mixture of the first component and a second fluid component. The device comprises a rich reservoir, a lean reservoir, a pump reservoir, a bridge structure, and an acoustic/pressure wave source. The rich reservoir is for containing a fluid mixture having an elevated concentration of the first component. The lean reservoir is for containing a fluid mixture having a lesser concentration of the first component that is leaner than the concentration of the first component in fluid mixture of the rich reservoir. The pump reservoir contains a fluid mixture of the first component and the second fluid component. The bridge structure has a sidewall defining a gradient channel in fluid communication with the rich reservoir and the lean reservoir and a length extending there between. The gradient channel is for containing a fluid having a concentration gradient of the first component along its length. A diffusion portion of the sidewall disposed between the gradient channel and the pump reservoir is adapted to permit diffusion of at least the first component between the gradient channel and the pump reservoir while preventing fluid flow there between. The acoustic/pressure wave source provides acoustic waves into the pump reservoir to cause pressure oscillations in the fluid mixture therein adjacent to the diffusion portion to move molecules of the target component against the concentration gradient from the lean reservoir into the rich reservoir.

28 Claims, 5 Drawing Sheets

U.S. PATENT DOCUMENTS

| | | | |
|---|---|---|---|
| 4,339,247 A * | 7/1982 | Faulkner et al. | |
| 4,398,398 A | 8/1983 | Wheatley et al. | |
| 4,673,512 A * | 6/1987 | Schram | |
| 4,770,675 A | 9/1988 | Kurzweg et al. | |
| 4,953,366 A | 9/1990 | Swift et al. | |
| 5,147,562 A * | 9/1992 | Heyman | |
| H1568 H * | 8/1996 | Huang et al. | |
| 5,951,456 A * | 9/1999 | Scott | |
| 6,210,470 B1 * | 4/2001 | Philips et al. | |
| 2003/0134426 A1 * | 7/2003 | Jiang et al. | 436/121 |
| 2003/0192427 A1 * | 10/2003 | Geller et al. | |
| 2006/0027487 A1 * | 2/2006 | Matsuura | |
| 2006/0223185 A1 | 10/2006 | Fedorov et al. | |

FOREIGN PATENT DOCUMENTS

WO  PCT/US2008/055821  3/2008

OTHER PUBLICATIONS

N. D. Srinivas, R. S. Barhate, K. S. M. S. Raghavarao, P. Todd, "Acoustic demixing of aqueous two-phase systems," Appl Microbiol Biotechnol (2000) 53: pp. 650-654.

R. E. Beard and H. S. Muralidhara, "Mechanistic Considerations of Acoustic Dewatering Techniques," 1072-1985 Ultrasonics Symposium, 1985 IEEE, pp. 1072-1075.

Semyonov, S. N., Maslow, K. I., "Acoustic field-flow fractionation," Journal of Chromatography (1988); SciFiner Scholar, Aug. 27, 2007; pp. 1-2.

Tolt, Thomas L., Feke, Donald L., "Analysis and application of acoustics to suspension processing," Proceedings of the Intersociety Energy Conversion Engineering Conference (1988), $23^{rd}$ (vol. 4), 327-31; SciFinder Scholar, Aug. 27, 2007; pp. 1-2.

Rajendrani Mukhopadhyay, "Continuous separations by acoustic forces," Research Profiles; *Analytical Chemistry*, Aug. 1, 2007, p. 5504.

Masanori Sato, Kazuo Matsuura, Toshitaka Fujii, "Ethanol separation from ethanol-water solution by ultrasonic atomization and its proposed mechanism based on parametric decay instability of capillary wave," *2001 American Institute of Physics*, Journal of Chemical Physics, vol. 114, No. 5, Feb. 1, 2001; pp. 2382-2386.

Tolt, Thomas L., Feke, Donald L., "Separation," "dispersed phases," "liquid," and "acoustically driven chambers," closely associated with one another, Chemical Engineering Science (1993), 48 (3), 527-40, SciFinder Scholar, Aug. 27, 2007; pp. 1-2.

P. S. Spoor and G. W. Swift, "Thermoacoustic Separation of a He-Ar Mixture," *2000 The American Physical Society*, Physical Review Letters, vol. 85, No. 8, Aug. 21, 2000; pp. 1646-1649.

G. W. Swift, "Thermoacoustic engines," J. Acoust. Soc. Am. 84 (4), Oct. 1988, *Acoustical Society of America*, pp. 1145-1180.

Manoj Kumar, Donald L. Feke, Joanne M. Belovich, "Fractionation of Cell Mixtures Using Acoustic and Laminar Flow Fields," 2004 Wiley Periodicals, Inc., Biotechnology and Bioengineering, vol. 89, No. 2, Jan. 20, 2005, pp. 129-137.

Kumar et al.; Fractionation of Cell Mixtures Using Acoustic and Laminar Flow Fields; Wiley Periodicals; Jan. 20, 2005; 129-137; Biotechnology and Bioengineering, vol. 89, No. 2.

* cited by examiner

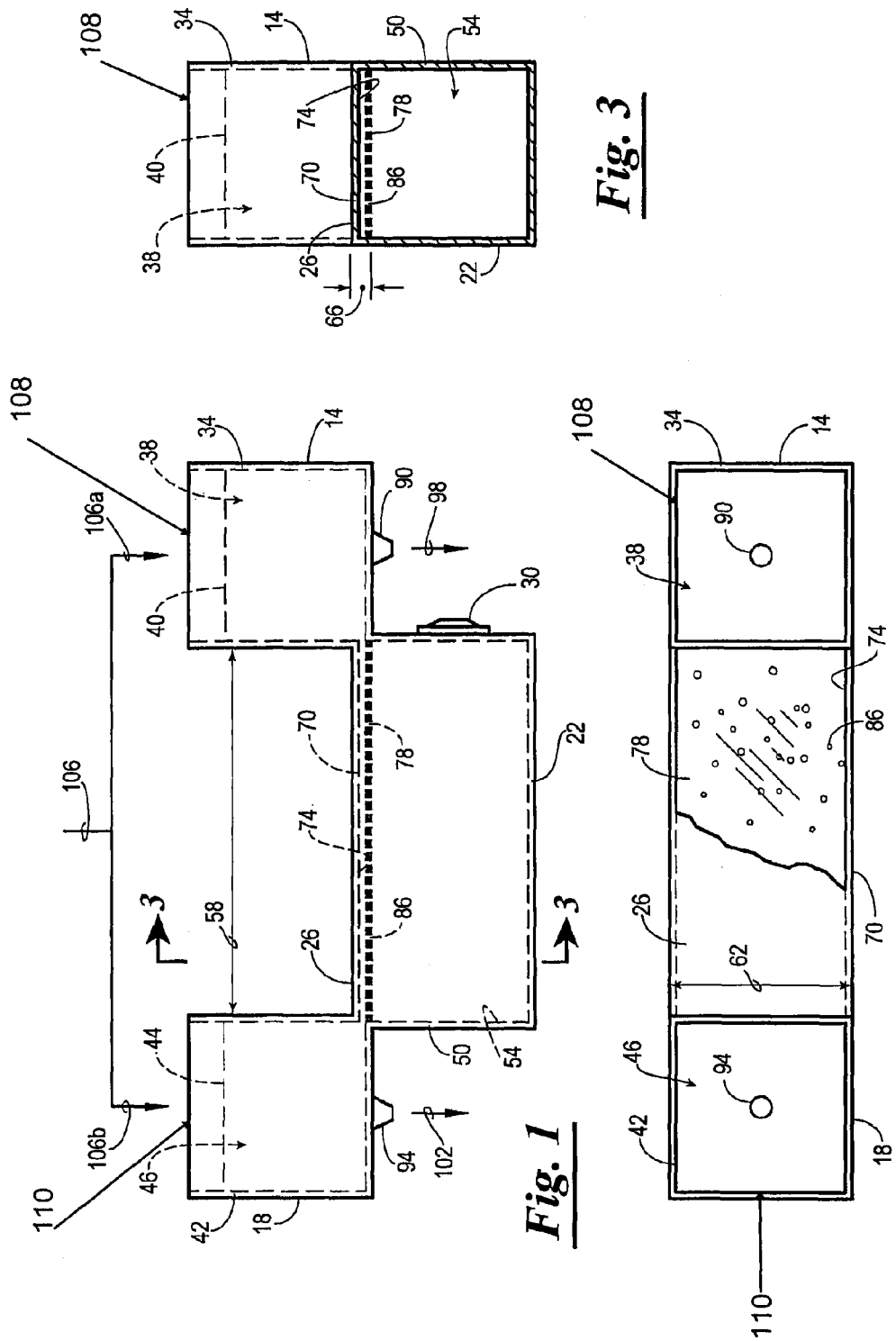

ACOUSTIC/PRESSURE WAVE-DRIVEN SEPARATION DEVICE

CROSS-REFERENCE TO RELATED APPLICATIONS

The present patent application claims benefit of provisional patent application No. 60/842,332, filed on Sep. 5, 2006, the entire content of which is hereby incorporated herein by reference

STATEMENT REGARDING FEDERALLY-FUNDED RESEARCH AND DEVELOPMENT

Not applicable.

THE NAMES OF THE PARTIES TO A JOINT RESEARCH AGREEMENT

Not applicable.

BACKGROUND OF THE INVENTION

1. Field of the Invention

The present invention relates generally to separating components of mixtures. More specifically, but not by way of limitation, the present invention relates to pressure-driven devices for moving molecules of at least one component against a concentration gradient to separate the at least one component from a mixture.

2. Discussion of Related Art

Separating mixtures efficiently and cost-effectively has long been an object of the prior art. More specifically, it is often desirable to separate one or more components out of a mixture containing several components. This applies especially to mixtures containing components having similar properties, and/or mixtures having a solid dissolved or otherwise dispersed within a liquid on a small scale that are often the most difficult or costly mixtures to separate. For example, a mixture of two liquids having similar boiling points can be especially expensive to separate by traditional means, such as distillation. Additionally, mixtures having a solid dissolved or otherwise dispersed in a liquid on a small scale can be especially difficult to separate by traditional means, such as screening and or filtration.

Numerous examples of such mixtures are well known in the art, such as, but not limited to, saltwater/seawater, petroleum and/or hydrocarbon mixtures, alcohol/water, propane/propylene, propanol/isopropanol, o-xylene/m-xylene, enantiomers, racemic mixtures, and/or nearly any other mixtures. Saltwater especially is a mixture for which it is highly desirable to separate into its major components, water and salts, as well as minor components, such as contaminants. The demand for efficient and effective separation or desalinization of saltwater is ever increasing, especially as the earth's population increases and traditional freshwater sources become contaminated with pollutants.

In the prior art, numerous attempts have been made, and numerous methods researched, for such difficult and/or desirable separations of mixtures. Some examples of such attempts and/or methods can be found in the following U.S. patent references: U.S. Pat. No. 4,339,247 (issued to Faulkner et al.); U.S. Pat. No. 4,673,512 (Schram); U.S. Pat. No. 5,147,562 (Heyman); U.S. Pat. No. 5,951,456 (Scott); U.S. Pat. No. 6,210,470 (Phillips et al.); U.S. Application Publication No. 2003/0192427 (Geller et al.); U.S. Application Publication No. 2006/0027487 (Matsuura); Statutory Invention Registration H1,568 (Huang et al.), all of which are incorporated herein by reference in their entirety. Additional examples may also be found in the following non-patent references: Mandralis, Z. I. and Feke, D. L., Continuous suspension fractionation using acoustic and divided-flow fields, Chemical Engineering Science (1993), 48(23), 3897-905; Mukhopadhyay, R., Research Profiles: Continuous separations by acoustic forces, Analytical Chemistry (2007), 79(15), 5504; Muralidhara, H. S. and Ensminger, D., Acoustic dewatering and drying: state of the art review, Proceeding to the $4^{th}$ International Drying Symposium, (1984), 1, 304-15; Nii, S., Matsuura, K., Fukazu, T., Toki, M., and Kawaizumi, F., A novel method to separate organic compounds through ultrasonic atomization, Chemical Engineering Research and Design (2006), 84(A5), 412-415; Sato, M., Matsuura, K., and Fujii, T., Ethanol separation from ethanol-water solution by ultrasonic atomization and its proposed mechanism based on parametric decay instability of capillary wave, Journal of Chemical Physics (2001), 114(5), 2382-2386; Semyonov, S. N. and Maslow, K. I., Acoustic field-flow fractionation, Journal of Chromatography (1988), 446, 151-6; Spoor, P. S. and Swift, G. W., Thermoacoustic Separation of a He—Ar Mixture, Physical Review Letters (2000), 85(8), 1646-1649; Srinivas, N. D., Barhate, R. S., Raghavarao, K. S. M. S., and Todd, P., Acoustic demixing of aqueous two-phase systems, Applied Microbiology and Biotechnology (2000), 53(6), 650-654; Tolt, T. L. and Feke, D. L., Analysis and application of acoustics to suspension processing, Proceedings of the $23^{rd}$ Intersociety Energy Conversion Engineering Conference (1988), 4, 327-31; Tolt, T. L. and Feke, D. L., Separation of dispersed phases from liquids in acoustically driven chambers, Chemical Engineering Science (1993), 48(3), 527-40.

Thermoacoustic engines and heat pumps have been developed to transport thermal energy against a temperature gradient. In general, such devices provide one or more plates disposed within a tube or channel. The plate(s) are provided with a low-temperature thermal sink at one end and a high-temperature thermal source at the other end so as to create and maintain a thermal gradient along the length of the plates. An acoustic source activated to provide standing (and in some cases traveling) acoustic waves along the length of the plates to cause pressure oscillations in the gas and/or other fluid along the length of the plates. Such pressure oscillations create spatial and volumetric oscillations in the fluid along the length of the plates as well. The oscillating field of pressure induces an oscillating velocity field. Because the fluid is compressible, the oscillations cause the fluid along the length of the plate to absorb thermal energy from the relatively colder end of the plate and transport the thermal energy towards the relatively hotter end of the plate, against the temperature gradient.

As will also be appreciated by those skilled in the art, the vast majority of heat transfer occurs within or near the boundary layer of the fluid along the plate. Additionally, the oscillations in pressure, and thereby temperature and volume, are limited by the power of the acoustic waves supplied, and thus higher capacity for thermal transport against the gradient may, in some cases, be more easily achieved by increasing the surface area of the plate or plates available for the transfer and transport of thermal energy.

A more detailed description of such thermoacoustic devices, as well as illustrative figures, may be had by reference to "Thermoacoustic engines" by G. W. Swift, in the *Journal of the Acoustical Society of America*, Volume 84, Pages 1145-1180, October 1988 (J. Acoust. Soc. Am. 84(4), October 1988), the entire content of which is hereby incorporated herein by reference.

All patents, published patent applications, and published articles and references listed herein are hereby expressly incorporated by reference in their respective entireties.

BRIEF DESCRIPTION OF THE DRAWINGS

FIG. 1 is a side-view diagram of one embodiment of an acoustically-driven separation device which is constructed in accordance with the present invention.

FIG. 2 is a partially-cutaway, plan-view diagram of the acoustic/pressure wave-driven device of FIG. 1.

FIG. 3 is a cross-sectional diagram of the acoustic/pressure wave-driven device of FIGS. 2 and 3, taken along the line 3-3 of FIG. 1.

DETAILED DESCRIPTION OF EXEMPLARY EMBODIMENTS

Figure 4:
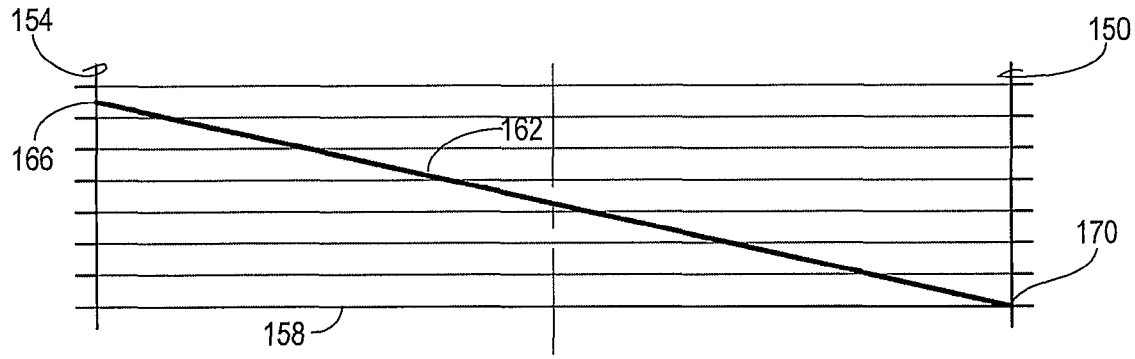
FIG. 4 is a graphical representation of a concentration gradient between a rich reservoir and a lean reservoir of the acoustic/pressure wave-driven device of FIG. 1.

Referring now to the drawings, and more particularly to FIGS. 1, 2, and 3, various diagrammatic views are shown of an acoustically/pressure wave-activated separation device constructed in accordance with the present invention and referred to herein by reference numeral 10 for separating at least one liquid or gaseous mixture, such as a saltwater mixture, a petroleum and/or hydrocarbon mixture, an alcohol/water mixture, a propane/propylene mixture, a propanol/isopropanol mixture, an o-xylene/m-xylene mixture, an enantiomer mixture, a racemic mixture, a pharmaceutical mixture, a drug-related mixture, other mixtures containing one or more of the before-recited mixtures and/or combinations thereof. More specifically, FIG. 1 depicts a side view diagram of the device 10, FIG. 2 depicts a partially-cutaway plan- or top-view diagram of the device 10, and FIG. 3 depicts a cross-sectional diagram of the device 10 taken along the line 3-3 of FIG. 1. Although the device 10 may be interchangeably referred to herein as a separation device, mass pump and/or a device 10, it should be understood that although separation of at least one target component from a mixture is one useful implementation, the device 10 may lend itself to other implementations and the characterization of the device 10 as a separation device should not be construed as limiting. For purposes of illustration, and as an example only, the device 10 will be described below as separating a mixture of salt and water, such as seawater, but it should be understood that the device 10 may be adapted to separate nearly any mixture, such as those listed above, as well as other functions and implementations.

The device 10 preferably includes one or more lean reservoirs 14, one or more rich reservoirs 18, a pump reservoir 22, one or more bridge structures 26, and one or more acoustic/pressure wave sources 30. The reservoirs 14, 18 and 22 are preferably formed of a rigid, inert material, for example: a metal, such as stainless steel; a plastic or thermoplastic material, such as plexiglass or polycarbonate; or any other material suitable for containing the components and/or mixtures to be separates. In other embodiments, the reservoirs 14, 18, and 22 may be formed in any suitable shape to permit the device 10 to function as described below. In some embodiments, it may be preferable for a portion of the reservoirs 14, 18, and 22 to be formed of a flexible or collapsible material, for example, to permit the device 10 to be compacted or otherwise reduced in size to facilitate easier transport or storage of the device 10. It should also be appreciated that the reservoirs 14, 18, and 22 may be constructed from any suitable material that permits the device 10 to function as described herein, and that such materials need not be entirely inert, but are preferably substantially inert with respect to the mixture and components of the mixture separated by the device 10.

The lean reservoir 14 preferably has a sidewall 34 or other structure defining an inner space 38 adapted to receive, and in operation, containing, a volume 40 of lean fluid having a concentration of the at least one target component or "first" component. For example, to separate a fluid mixture of salt-water having a "first" component (salt) and a "second" fluid component (water), the space 38 of the lean reservoir 14 will preferably contain a volume 40 of water, which may also be referred to herein as fresh or desalted water having a relatively low or lean concentration of at least one salt. For such an example, and hereinafter, salt may be interchangeably referred to as the first component or the at least one target component, although it will be understood that it may be desirable to produce drinking water and/or separated salts by way of the separation process contemplated herein. Although theoretically it is desirable for the concentration of salt in the water or saltwater of the lean reservoir 14 to be very low at potable or irrigation saline limits, it will generally be more practical and cost-efficient to maintain a concentration of salt in the water of the lean reservoir 14, that is within a range for which the salt concentration is safe and acceptable for human or mammal ingestion, the separation process will be sufficient to produce drinking water. Alternatively, the water produced as a result of the present invention may be suitable for agricultural use. In other implementations, the concentration of the at least one target component in the mixture contained in the lean reservoir 14 need only be within acceptable limits of the components or products produced by the separation process of the device 10, as will be described in more detail below.

The rich reservoir 18 is similar in construction and function to the lean reservoir 14, with the exception of the mixture contained in the rich reservoir 18. More specifically, the rich reservoir 18 preferably has a sidewall 42 or other structure defining an inner space 46 containing a volume 48 of fluid (brine) having a relatively high or rich concentration of the at least one target component (e.g., the at least one salt within the brine). The concentration of salt in the brine of the rich reservoir 18 is relatively higher than the concentration of salt in the fresh or desalted water contained in the lean reservoir 14 and the feed The pump reservoir 22 also preferably has a sidewall 50 or other suitable structure that defines an inner space 54 containing a fluid (e.g., saltwater) having a concentration of the first component or at least one target component (salt). The salt concentration in the saltwater within the pump reservoir 22 is preferably between the salt concentration of the saltwater in the lean reservoir 14 and the salt concentration of the saltwater in the rich reservoir 18, although, in various implementations or mixtures, certain concentrations of the at least one target component may function more effectively than others.

The bridge structure 26 preferably extends a length 58 between the lean reservoir 14 and the rich reservoir 18. The bridge structure 26 may also preferably be formed with a width 62 (FIG. 2) and a height 66 (FIG. 3). In other embodiments, the bridge structure 26 may be formed with any cross-sectional shape (FIG. 3), for example, round, triangular, ovular, fanciful, or the like. As such, the bridge structure 26 may be defined or described with any suitable dimension, for example, radius, diameter, major/minor diameter, perimeter length, circumference, or the like. In the embodiment shown, the pump reservoir 22 is preferably formed with a size corresponding to the length 58 and width 62, such that the bridge structure may form an upper wall, cover, or lid, for the pump reservoir 22. It should be appreciated that portions of the bridge structure 26 or the entire bridge structure 26 may be formed integrally with, and/or separately from, the pump reservoir 22 so as to define the limits of the pump reservoir 22. In other embodiments, the bridge structure 26 may be formed with smaller length 58, width 62, and height 66 that are smaller than the size of the pump reservoir 22, so as to permit the bridge structure 26 to fit partially or wholly within the pump reservoir 22, as will be described in more detail below with reference to FIG. 6.

The bridge structure 26 preferably has at least one sidewall 70 defining a gradient channel 74. As will be appreciated by those skilled in the art, in the embodiment depicted in FIGS. 1-3, the internal dimensions of the gradient channel 74 generally correspond closely to the dimensions of length 58, width 62, and height 66 of the bridge structure 26. More specifically, the internal dimensions of the gradient channel 74 equal the dimensions (length 58, width 62, and height 66) of the bridge structure 26 with the respective thickness of each corresponding sidewall 70 subtracted. The sidewall 70, and/or any other suitable structures that define the gradient channel 74 may be of unitary construction or may be formed with multiple pieces or portions.

At least a portion of the sidewall 70, referred to herein as a diffusion portion 78, is disposed between the gradient channel 74 and the space 54 defined by the pump reservoir 22. The diffusion portion 78 of the bridge structure 26 is adapted to permit diffusion of at least the first component, such as salt, between the gradient channel 74 and the space 54 defined by the pump reservoir 22, while preventing fluid flow between the gradient channel 74 and the space 54 defined by the pump reservoir 22. In the preferred embodiment, the diffusion portion 78 is formed of a rigid or semi-rigid membrane material that permits diffusion of at least the first component (e.g. salt) through the diffusion portion 78 while preventing fluid flow through the diffusion portion 78. The diffusion portion 78 is preferably formed of a membranous material, for example, polymer, latex, and/or other plastics, rubbers, or natural and/or synthetic fibrous materials, having a microporous structure having plurality of pores 86 (or porous passages) therethrough. Although the pores 86 are shown enlarged in FIGS. 1-3 for clarity and ease of understanding, it will be appreciated by those skilled in the art that the pores 86 will be extremely small (on a nanoscale or microscale) to permit the diffusion portion 78 to function as described herein. In the preferred embodiment, the membranous material of the diffusion portion 78 preferably has known characteristics such as porosity, pore diameter and length as well as tortuosity, such that the function of the diffusion portion 78 may be predicted and/or modeled, and the device 10 may be reliably manufactured to function within desirable operating parameters, for example, capacity and/or rates of separation.

The membrane material of the diffusion portion 78 is also preferably substantially inert with respect to the mixture being separated. The diffusion portion 78 of the sidewall 70 is also preferably rigid or semi-rigid so as to isolate the gradient channel 74 from pressure oscillations and/or flow-induced vibrations or pressure variations within the space 54 of the pump reservoir 22 such that the gradient channel 74 may be maintained in a substantially-static or steady state during operation of the device 10.

As will be appreciated by those skilled in the art from the description of the function of the device 10 below, the majority of molecular activity within the gradient channel 74 takes place within a boundary layer (not shown) adjacent the diffusion portion 78 of the sidewall 70. Thus, in most embodiments, there is little need for the height 66 of the bridge structure 26 to be great enough to leave much more space than the thickness of the boundary layer between the respective sidewall 70 and diffusion portion 78 for the gradient channel 74. Practical manufacturing constraints such as ease and cost of manufacture may, in some cases require that the height 66 be large enough to accommodate a space between the sidewall(s) 70 and 78 on the order of, for example, ten to 100 times the thickness of the boundary layer (not shown). In some embodiments, the height 66 may be great enough to permit the height of the gradient channel 74 to be even larger. As will be appreciated, the height or thickness of the gradient channel 74 for the embodiment of the device 10 depicted will be equal to the height 66 minus the thickness of the sidewall 70 and the diffusion portion 78. Similarly, the width of the gradient channel 74 will be equal to the width 62 minus two thicknesses of the sidewall 70. Thus, the height, width, or other dimension of the gradient channel 74, as may herein be referred to or described, will correspond to the internal dimensions (length, width, and height) of the bridge structure 26 and the maximum dimensions of the gradient channel 74 defined therein and therethrough.

The acoustic/pressure wave source 30 is preferably positioned so as to provide acoustic waves of known characteristics to the pump reservoir 22, and more specifically, to the fluid contained within the space 54 defined by the pump reservoir 22, so as to induce pressure oscillations of the fluid within the pump reservoir 22. The acoustic/pressure wave source 30 may be in direct physical contact with the sidewall 50 of the pump reservoir 22, or spaced a distance therefrom (not shown). In other embodiments, the acoustic/pressure wave source 30 may be placed within the space 54 defined by the pump reservoir 22. The acoustic/pressure wave source 30 may be any suitable source of acoustic waves, for example, one or more speakers, piezoelectric elements, vibrating membranes, moving member(s), or the like or combinations thereof. The acoustic/pressure wave source 30 can introduce the acoustic or pressure waves in a variety of manners, either directly or indirectly and/or from a variety of locations. Preferably, the acoustic/pressure wave source 30 is either tunable to provide acoustic or pressure waves having desired characteristics, or inherently provides acoustic or pressure waves of predetermined characteristics. Such characteristics may include, but are not limited to, frequency, wavelength, amplitude, phase, and or any other characteristics known in the art and/or inherent to acoustic waves. In the preferred embodiment, the acoustic/pressure wave source 30 provides standing acoustic waves. However, in other embodiments, traveling, or any other suitable types of acoustic or pressure waves may be provided that permit and/or enable the device 10 to function as described herein in accordance with the present invention. The acoustic/pressure wave source 30 is also preferably adjustable or selectively controllable, by any suitable methods, such that the frequency and/or the amplitude of the acoustic or pressure waves provided may be selectively varied to vary the power delivered to the pump reservoir 22 by the acoustic waves.

As shown in FIGS. 1-3, for example, the lean reservoir 14 and the rich reservoir 18 are preferably disposed so as to be out of the direct line of the acoustic waves in the pump reservoir 22, and produced by the acoustic/pressure wave source 30. In other embodiments, the lean reservoir 14 and rich reservoir 18 may be acoustically insulated so as to insulate the fluid therein from a portion of, or substantially all of, the acoustic waves provided by acoustic/pressure wave source 30. In yet further embodiments, the lean reservoir 14 and rich reservoir 18 may be in direct or indirect acoustic communication with the acoustic/pressure wave source 30.

Each of the lean reservoir 14 and rich reservoir 18 is also preferably provided with at least one product outlet 90 and 94, respectively. A lean product stream 98 can be output from the lean reservoir 14 via product outlet 90, and a rich product stream 102 can be output from the rich reservoir 18 via product outlet 94. The product outlets 90 and 94 are preferably controllable and selectively capable of synchronization so as to permit the extraction of lean and rich product streams 98 and 102, respectively, at substantially-desirable and/or predetermined rates so as to balance, maintain, and/or otherwise adjust or determine the relative concentrations of salt in the mixtures within the lean reservoir 14 and the rich reservoir 18, the concentration gradient in the fluid (or gas) of the gradient channel 74, and/or any other parameters or characteristics of the device 10. In many embodiments, it may further be desirable to connect valves, tubes, hoses, and/or any other conduits to the product outlets 90 and 94 to control and collect the lean product stream 98 and rich product stream 102, respectively. In other embodiments, the lean and rich product streams 98 and 102, respectively, may be controlled, directed, collected, or the like in any suitable fashion for a particular embodiment or implementation of the device 10. The product outlets 90 and 94 may be constructed, formed, or otherwise provided with any suitable structure or mechanism to permit the function described herein. For example, the product outlets 90 and 94 may include any suitably-controllable valves, orifices, apertures, or the like.

In the exemplary description of the separation of seawater, the lean product stream 98 will comprise water having a relatively low concentration of salt (e.g., fresh water or desalted water), and the rich product stream 102 will comprise water having a relatively high concentration of salt (e.g., brine). As will be appreciated, the concentration of salt in the lean product stream 98 will preferably be at least about equal, and more preferably substantially equal, to the concentration of salt in the fluid of the lean reservoir 14. Similarly, the concentration of salt in the rich product stream 102 will preferably be at least about equal, and more preferably substantially equal, to the concentration of salt in the fluid of the rich reservoir 18. Although, the lean and rich product streams 98 and 102, respectively, are described herein as "streams," it should be appreciated that the respective lean and rich product streams 98 and 102 may be extracted at any suitably-functional rate for a given implementation, embodiment, or application of the device 10.

As will be appreciated by those skilled in the art, fluid volumes depleted by the outgoing lean and rich product streams 98 and 102, respectively, are preferably replaced with incoming and generally unseparated "raw" or "crude" mixture streams 106a and 106b entering lean reservoir 14 and rich reservoir 18, respectively via openings 108 and 110, to be separated such that the outgoing lean and rich product streams 98 and 102, respectively, are maintained during operation at known rates. It will also be appreciated that during normal operation of the device 10, the incoming crude streams 106a and 106b are preferably provided to the lean reservoir 14 and the rich reservoir 18 as a function of the concentrations of the lean reservoir 14 and the rich reservoir 18 and the concentration of the streams 106a and 106b or otherwise-equivalent rates to those of the outgoing lean and rich product streams 98 and 102, respectively. The incoming crude mixture streams 106a and 106b may be provided by any suitable means, for example, hoses, nozzles, pumps, or the like, and may originate at a single crude mixture source 106, or may originate from separate sources (not shown). In some embodiments, it may be desirable and/or advantageous to perform some preliminary separation prior to delivering the incoming crude mixture streams 106a and 106b to the lean and rich reservoirs 14 and 18, respectively, such that the concentration of the at least one target component (e.g., salt) in the crude mixture stream 106a is different from (e.g., lower than) the concentration of the at least one target component (e.g., salt) in the crude mixture stream 106b. In any event, the crude mixture streams 106a and 106b are preferably not in a final or desired stage of separation prior to entering the device 10, such that the device 10 provides some measure of additional separation of the at least one target component from the crude mixture(s).

Referring now to FIGS. 4 and 5A-5G, the operation of the device 10 will be described conceptually. FIG. 4 depicts an approximation of the concentration gradient in the gradient channel 74 (FIGS. 1-3) along the length 58 (FIG. 1) of the gradient channel 74. More specifically, the vertical axis designated by the reference numeral 150 spatially corresponds to the intersection of the gradient channel 74 and the space 38 defined by the lean reservoir 14 (FIG. 1). Similarly, the vertical axis designated by the reference numeral 154 spatially corresponds to the intersection of the gradient channel 74 and the space 46 defined by the rich reservoir 18, such that the portion of the horizontal axis 158 between vertical axes 150 and 154 corresponds in length with the length 58 of the gradient channel 74 (FIG. 1). Thus, the linear curve 162 depicts an approximation of the concentration gradient from a relative high concentration 166 corresponding to the rich reservoir 18 to a relative low concentration 170 corresponding to the lean reservoir 14. The curve 162 can be linear, non-linear, parabolic, or the like, or any combination thereof.

Referring now to FIGS. 5A-5G, depicted is the bridge structure 26, as well as a portion of each of the lean reservoir 14, rich reservoir 18, and pump reservoir 22. The following is a conceptual discussion of how the device 10 operates. As will be appreciated by those skilled in the art, a volume of fluid may be conceptually considered as comprising a collection of tiny "packets" or "parcels." As such, the fluid mixture 172 within the gradient channel 74 is depicted as a conceptual representation having a plurality of gradient packets, e.g. 174, 178, 182, and 186. As will be appreciated, in this substantially-linear-gradient embodiment, the concentration of the first component (e.g., salt) within each of the packets, e.g., 174, 178, 182, 186, of the fluid 172 will increase with relative proximity to the rich reservoir 18. It should be understood that the packets are being discussed for illustrating how the device 10 operates. In practice, the fluid mixture 172 is a continuum of molecules. For example, packet 186 will have a higher salt concentration than packet 182, in proportion to the relatively closer proximity to the rich reservoir 18 than that of packet 182. Similarly, packet 182 will have a higher salt concentration than packet 178, and 178 greater than 174, in like fashion. Although packets are shown extending along nearly the entire length 58 (FIG. 1) of the gradient channel 74, only a few of such packets are numbered for brevity. The packets, e.g., 174, 178, 182, and 186, of the fluid 172 within the gradient channel are preferably substantially still during operation of the device 10. That is, the packets, e.g. 174, 178, 182, and 186, preferably move very little, if at all, on a macroscopic scale so as to maintain the concentration gradient of the fluid 172 in the gradient channel 74 in a substantially constant or steady state. Thus, the packets, e.g., 174, 178, 182, 186, are shown abutting one another and with constant position and volume throughout FIGS. 5A-5G.

Figure 5A:
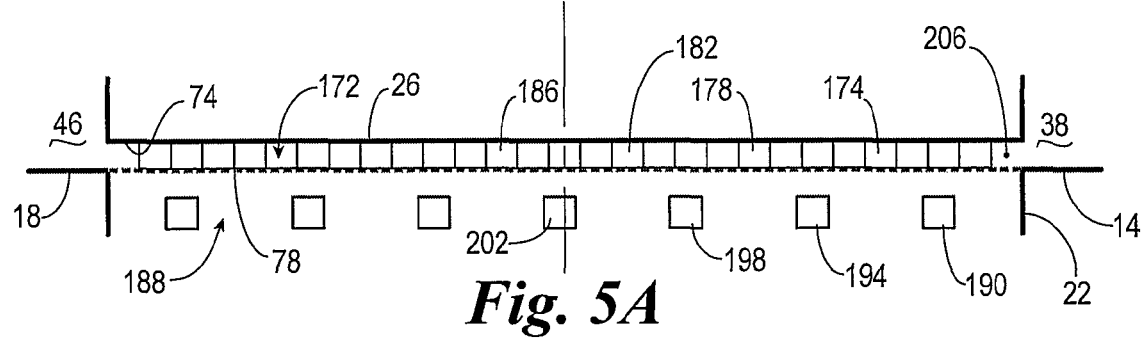
FIGS. 5A-5G are enlarged views of a bridge structure of the acoustic/pressure wave-driven device illustrating the function of the device.

Similarly, a fluid 188 within the pump reservoir 22 may also be conceptually considered as comprising a plurality of packets, e.g. 190, 194, 198, and 202. Although only a few packets, e.g. 190, 194, 198, 202 are shown and numbered, it should be appreciated that such conceptual packets will necessarily encompass the entire volume of fluid 188. FIG. 5A depicts a moment in which the acoustic/pressure wave source 30 is deactivated, as indicated by the lack of acoustic waves within the fluid 188 of the pump reservoir 22.

During operation of the device 10, crude mixture streams 106a and 106b deliver crude mixture(s) at known rates such that the power provided to the pump reservoir 22 by the acoustic/pressure wave source 30 is preferably adjusted to correspond to that required by the desired rate of separation. Simultaneously with the incoming crude mixture streams 106a and 106b, the lean and rich product streams 98 and 102, respectively, preferably remove separated products from the lean and rich reservoirs 14 and 18, respectively, at a rate corresponding to that of the inputs of crude mixture streams 106a and 106b and the desired concentrations of the lean and rich reservoir. As will be described in more detail below, a nearly infinite number of the packets, e.g. 190, 194, 198, and 202, carry the at least one target component from the fluid volume 40 of the lean reservoir 14 to the fluid volume 48 of the rich reservoir 18.

The crude mixture stream 106a (FIG. 1) input into the fluid volume 40 of the lean reservoir 14 will generally have a higher concentration of the first component (e.g., salt) than the fluid volume 40 already in the lean reservoir 14. Thus, as the crude mixture stream 106a is added, a surplus of molecules of the first component (e.g., salt) will develop within the lean reservoir 14. In order to separate the first component (e.g., salt) from the fluid mixture (fluid volume 40), the molecules of salt must be transported to the rich reservoir 18. Although it will be appreciated that all of the packets, e.g. 190, 194, 198, 202, or at least the ones adjacent to the diffusion portion 78, will cooperate to transport numerous molecules of the at least one target component against the concentration gradient within the gradient channel 74, by way of illustration, the path of a single exemplary molecule 206 will be described herein.

Figure 5B:
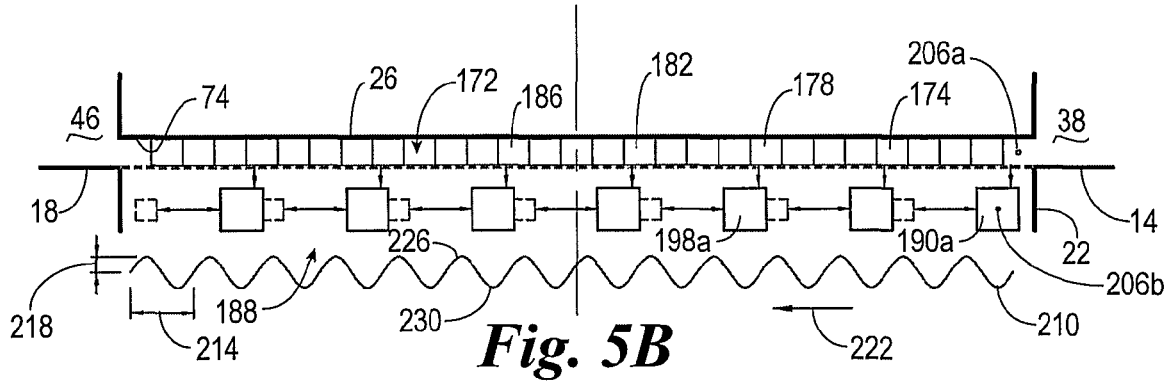

Referring now to FIG. 5B, acoustic/pressure waves 210 are provided to the fluid 188 tank reservoir 22 from the acoustic/pressure wave source 30. The acoustic/pressure waves 210 are preferably of known characteristics, for example, wavelength 214 and amplitude 218. Although the acoustic/pressure waves 210 are depicted moving in a first direction 222 corresponding to the position of the acoustic/pressure wave source 30 (FIG. 1), it should be appreciated that the direction of travel for the acoustic/pressure waves 210 may be in any suitable orientation. As the acoustic/pressure waves 210 pass through the fluid 188 within the pump reservoir 22, the waves generate oscillations in pressure within the fluid 188. Such oscillations may be characterized as having a relative maximum or "max" pressure and a relative minimum or "min" pressure, which for clarity and brevity correspond in the FIGS. 5B-5G to the peaks 226 and valleys 230 of the acoustic/pressure wave 210 depicted.

As shown in FIG. 5B, each of the packets 190, 194, 198, 202, will oscillate between a first location having a relative min pressure and a second location having a relative max pressure. For example, packet 190 will oscillate between a first location 190a having a relative min pressure and a second location 190b having a relative max pressure. As will be appreciated by those skilled in the art, when the packet 190 is in the first location 190a having the relative min pressure, the volume of the fluid in the packet 190 will increase. As will further be appreciated, as the volume increases, the concentration of the at least one target component in the packet 190 will also decrease. Conversely, when the packet 190 moves to the second position 190b, the pressure increases to a relative max pressure, which decreases the volume of the packet 190, thereby increasing the concentration of the at least one target component within the fluid of the packet 190. Similarly, and as depicted, the other packets, e.g. 194, 198, and 202, of fluid 188 within the pump reservoir 22 and adjacent to the membrane material 82, will undergo similar spatial, pressure, volume, and concentration oscillations. Although water and other liquids are assumed to be incompressible on macroscopic scale and the packets, e.g., 190, 194, 198, 202, are depicted in a greatly conceptually magnified form for clarity, it will be appreciated by those skilled in the art that, these fluids exhibit after all finite compressibility and therefore, they shrink or expand with higher or lower pressure. Thus at the packet level representation, the oscillations in volume of the fluid packets are sufficient to permit functional changes and concentration to permit the device 10 to function as follows. If a continuous fluid representation is used, instead of the convenient and illustrative representation of packets moving back and forth, then what is taking place is that a pressure standing wave is present, which induces velocity and density oscillations, then because of the changes in density, and because the mass is constant, the concentration changes.

Beginning in FIG. 5A, the exemplary molecule 206 is shown positioned near the lean reservoir 14 in the gradient channel 74. As the acoustic/pressure wave 210 depicted in FIG. 5B starts the fluid 188 of the pump reservoir 22, packet 190 shifts to a first position 190a with a relative min pressure such that packet 190 expands to as shown in position 190a, reducing the concentration of salt within the fluid of the packet 190. The reduction of the concentration in the packet 190a causes a localized concentration gradient from the portion of the gradient channel 74 in which the molecule 206 was initially disposed to the packet 190a. The concentration gradient thus causes the molecule 206 to diffuse from its initial position, indicated by the reference numeral 206a, through the diffusion portion 78, to its final position 206b within packet 190a.

Figure 5C:
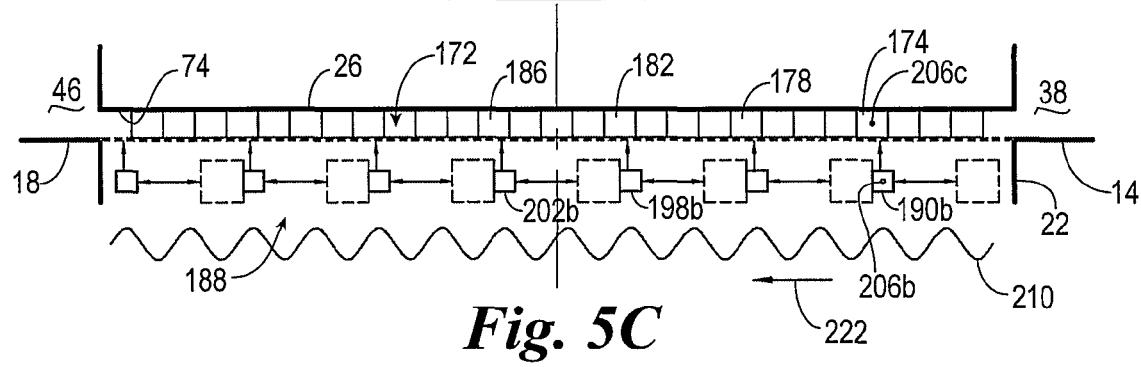

Referring now to FIG. 5C, the acoustic/pressure waves 210 in the fluid 188 of the pump reservoir 22 continues such that the packet 190 shifts to a second position 190b of relative higher (maximum) pressure, causing the volume of packet 190 to decrease and, consequently, the salt concentration of packet 190 to increase above that of packet 174 in the gradient channel 74. Thus, in position 190b, a local concentration gradient is created from packet 190 to packet 174, thereby causing the molecule 206 to diffuse from an position 206b, through the diffusion portion 78 to a position 206c within packet 174.

Figure 5D:
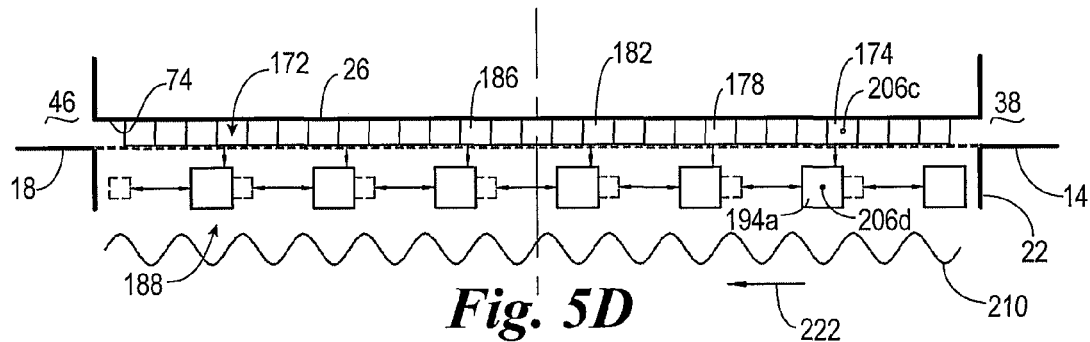

Continuing on, and as best shown in FIG. 5D, the acoustic/pressure waves 210 in the fluid 188 of the pump reservoir 22 continues, causing the packet 194 to oscillate back to a first position 194a having a relative lower (minimum) pressure, thereby increasing the volume of the packet 194 and decreasing the salt concentration of the fluid of packet 194. As described above, this drop in concentration creates a local concentration gradient from packet 174 to packet 194 when packet 194 is in the first position 194a, thereby causing the molecule 206 to diffuse from position 206c, through the diffusion portion 78, to a final position 206d within packet 194a.

Figure 5E:
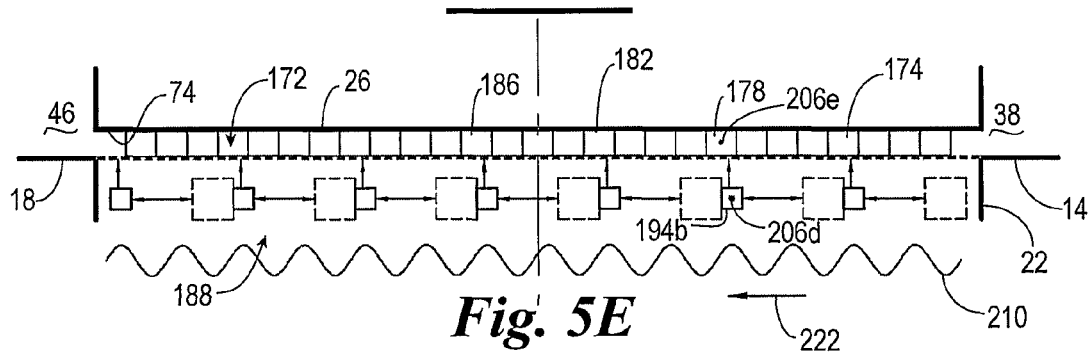

Continuing further, and as best shown in FIG. 5E, the acoustic/pressure waves 210 in the fluid 188 of the pump reservoir 22 continues, causing the packet 194 to oscillate back to a second position 194b having a relative max pressure, thereby decreasing the volume of the packet 194 and increasing the salt concentration of the fluid of packet 194. As described above, this rise in concentration creates a local concentration gradient from packet 194 to packet 178 when packet 194 is in position 194b, thereby causing the molecule 206 to diffuse from position 206d, through the diffusion portion 78, to a position 206e within packet 178.

Figure 5F:
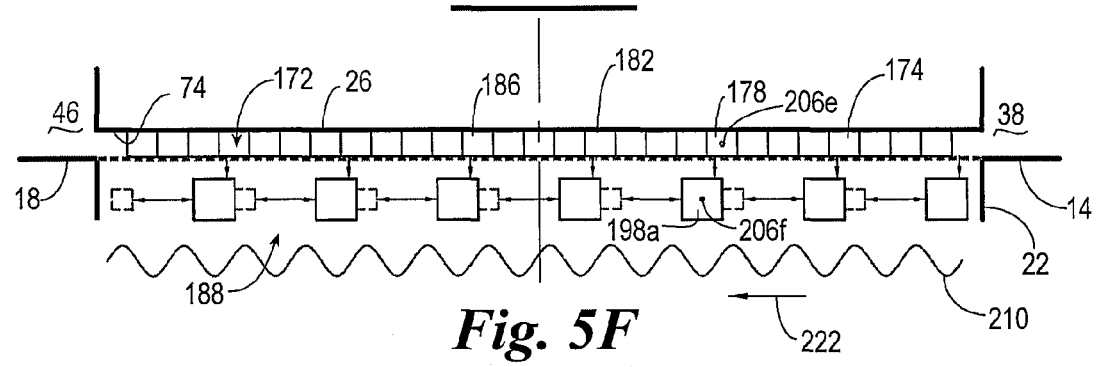

As best shown in FIG. 5F, the cycle continues as the acoustic/pressure waves 210 in the fluid 188 of the pump reservoir 22 continues, causing the packet 198 to oscillate back to a first position 198a having a relative min pressure, thereby increasing the volume of the packet 198 and decreasing the salt concentration of the fluid of packet 198. As described above, this drop in concentration creates a local concentration gradient from packet 178 to packet 198 when packet 198 is in position 198a, thereby causing the molecule 206 to diffuse from position 206d, through the diffusion portion 78, to a position 206e within packet 198a.

Figure 5G:
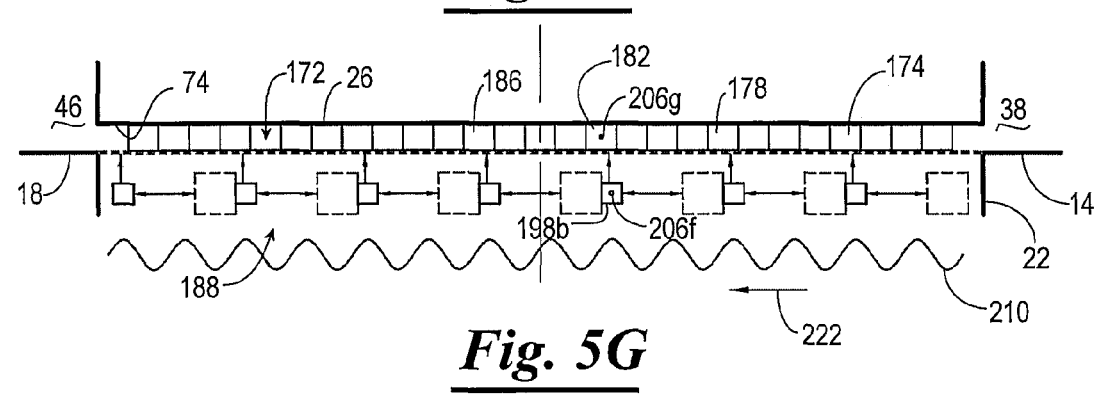

Finally, and as best shown in FIG. 5G, the acoustic/pressure waves 210 in the fluid 188 of the pump reservoir 22 continues, causing the packet 198 to oscillate back to a second position 198b having a relative max pressure, thereby decreasing the volume of the packet 198 and increasing the salt concentration of the fluid of packet 198. As described above, this rise in concentration creates a local concentration gradient from packet 198 to packet 182 when packet 198 is in position 198b, thereby causing the molecule 206 to diffuse from position 206f, through the diffusion portion 78, to position 206g within packet 182.

As will be appreciated by persons of ordinary skill in the art, the process described and depicted with reference to FIGS. 5A-5G, operates across a surface of the diffusion portion 78 via a nearly-infinite number of such tiny packets, e.g., 190, 194, 198, 202, transporting a nearly-infinite number of molecules, such as molecule 206, against the concentration gradient of the fluid 172 within the gradient channel 74, i.e., from the lean reservoir 14 to the rich reservoir 18.

Although for clarity the process is described as transporting one target component (salt) from out of the mixture (saltwater), the device 10 transports components in opposite directions, such as, for example, by transporting water molecules from the rich reservoir 18 to the lean reservoir 14 and transporting salt molecules from the lean reservoir 14 to the rich reservoir 18, or the like, for any mixture which it is desirable to separate one or more target components. In other embodiments, the device 10 may further be adapted to separate two fluids, such as water and alcohol, or the like, and/or two solids, such as two types of salts.

As will be appreciated by those skilled in the art, the separation capacity of the device 10 depends on a number of factors which may be varied to achieve desired results. For example, the expansion and contraction of the individual packets, e.g. 190, 194, 198, 202, or, alternatively explained using a continuous representation, the density oscillations, are limited by a variety of factors, and transport of the molecules of the at least one target gradient will be dependent on the creation of local concentration gradients to cause molecules to diffuse through the diffusion portion 78. Thus, the slope of the concentration gradient will affect the amount of power required of the acoustic/pressure waves 210 to achieve the necessary compression ratio of the packets. Intuitively, the greater the slope of the concentration gradient, the greater amount of power necessary for the device 10 to function as described. Thus, for higher concentration differentials between the lean and rich reservoirs 14 and 18, it will often be desirable to lengthen the bridge structure 26, and thereby the gradient channel 74.

Another factor which affects separation capacity is the rate of diffusion through the diffusion portion 78. The rate of diffusion through the diffusion portion 78 often depends on the porosity, pore diameter, and thickness of the diffusion portion 78. Thus, to increase the overall flux of the targeted component from the lean reservoir to the rich reservoir against the concentration gradient, thus also increasing the total flux through the diffusion portion 78, and thereby increase the separation capacity of the device 10, it may be desirable to increase the surface area of the membrane material of the diffusion portion 78 of sidewall 70 that separates and is adjacent to the fluid of the pump reservoir 22 and the fluid of the gradient channel 74. For example, the surface area may be increased by lengthening and widening the gradient channel 74, and/or by providing a plurality of gradient channels 74 each having a diffusion portion 78 adjacent to the fluid 188 of the pump reservoir 22. Additionally, by providing the bridge structure 26 with a diffusion portion 78 comprising a membrane material having increased porosity, decreased thickness and/or decreased tortuosity, the diffusion rate may also be increased. However, the porosity is preferably not increased, and the tortuosity is preferably not decreased, to a point at which pressure oscillations and/or other variations are substantially transferred from the pump reservoir 22 to the gradient channel 74, however, in some embodiments, it may in fact be desirable or advantageous to do so.

The foregoing factors are presented for exemplary purposes and are in no way intended to be limiting. It should be understood that numerous other factors affecting the performance and function of the device 10 are inherent in the structure and function of the device 10, and may be adjusted without departing from the scope of the invention. For example, the size of the lean and rich reservoirs 14 and 18 can be varied as well as the concentration of the at least one target component in the pump reservoir 22.

By way of example, an embodiment of the device 10 depicted in FIGS. 1-5G for separating a liquid mixture may be modeled in some respects with the following equations. It will be appreciated by those skilled in the art that the following equations do not attempt to encompass every aspect of the invention, nor do they necessarily set forth every step of their derivations. The equations include certain assumptions (like ignoring smaller second order viscous and thermal effects as well as others) and are intended merely to present certain elements of the invention which should assist one skilled in the art in making and using an embodiment of the device 10 as well as appreciating one or more aspects of the inherent theoretical foundations of the present invention. It should be understood that the following equations demonstrate one of many possible calculations related to the device 10.

Starting with the continuity equation:

$$\frac{\partial \rho_A}{\partial t} + \nabla(\rho_A v + J_A) = 0 \quad [\text{EQ. 1}]$$

Assuming a binary mixture, the molar flux $J_A$ being only concentration driven and Fick's Law.

$$\frac{\partial c_A}{\partial t} + v\nabla c_A \approx D\nabla^2 c_A - c_A \nabla v \quad [\text{EQ. 4}]$$

We now assume that on top of the concentration profile in the direction from the rich reservoir 18 to the lean reservoir 14 (the x direction or coordinate) $c_m(x)$, we add an oscillating part whose amplitude is given by $c_1(x,y)$. We also recognize that the mean velocity of the fluid in the x direction is zero, so we only write an oscillating term whose amplitude is given by $v_1(x)$ and finally, we do the same for the pressure, where an oscillating term with amplitude $p_1(x)$ is added on top of the mean pressure $p_m$, which is assumed constant. Thus, we write $$c_A = c_m(x) + c_1(x,y)e^{i\omega t} \quad [\text{EQ. 5}]$$

$$v = iv_1(x)e^{i\omega t} \quad [\text{EQ. 6}]$$

$$P = p_m + p_1(x)e^{i\omega t} \quad [\text{EQ. 7}]$$

Substituting, one gets:

$$i\omega c_1 e^{i\omega t} + iv_1 \frac{\partial c_m}{\partial x} e^{i\omega t} + iv_1 \frac{\partial c_1}{\partial x} e^{2i\omega t} = \quad [\text{EQ. 8}]$$
$$D\frac{\partial^2 c_1}{\partial y^2} e^{i\omega t} - ic_m \frac{\partial v_1}{\partial x} e^{i\omega t} - i\left(c_1 \frac{\partial v_1}{\partial x} + v_1 \frac{\partial c_1}{\partial x}\right)e^{2i\omega t}$$

If one now neglects diffusion in the x-direction and second order terms, one gets $$c_1 = -\frac{1}{\omega}\left(c_m \left|\frac{\partial v_1}{\partial x}\right| + v_1 \frac{\partial c_m}{\partial x}\right)[1 + e^{-(1+i)\sqrt{\frac{\omega}{2D}} y}] \quad [\text{EQ. 13}]$$

By looking at concentrations at y=0 (at the diffusion portion 78) and far away from the diffusion portion 78 one can obtain a critical concentration gradient that defines the limit at which the device is a mass pump $$\left(\frac{\partial c_m}{\partial x}\right)_{crit} = -\frac{c_m}{v_1}\frac{\partial v_1}{\partial x} = -\frac{c_m \omega}{a} \quad [\text{EQ. 16}]$$

where a is the speed of sound in the fluid. In other words, as in the case of a thermo-acoustic engine, mass transfer will take place in the direction described, i.e. against the gradient only if the gradient is smaller than a critical value, i.e.

$$\nabla c < \nabla c_{crit} \sim c_m \omega / a \quad [\text{EQ. 17}]$$

The molar flux in the x direction is obtained by integration using $\Pi$ as the plate width $$J_A = \Pi \int_0^\infty \overline{v_1 c_1} \, dy \quad [\text{EQ. 18}]$$
$$= \frac{1}{2}\Pi \int_0^\infty \text{Re}\{iv_1 c_1\} \, dy$$
$$= \frac{1}{2}\Pi \int_0^\infty v_1 \text{Im}\{c_1\} \, dy$$

Substituting $c_1$ we obtain $$J_A = \frac{\Pi(v_1)^2 \delta_c}{4\omega}\left(c_m \frac{\omega}{a} + \frac{\partial c_m}{\partial x}\right) \quad [\text{EQ. 19}]$$
$$= \frac{\Pi(v_1)^2 \delta_c}{4} \frac{c_m}{a}\left(1 + \frac{a}{c_m \omega}\frac{\partial c_m}{\partial x}\right)$$

where $$\delta_c = \sqrt{\frac{2D}{\omega}}$$

is the thickness of the penetration depth (where basically all the mass transfer effect takes place) was used. Expressing now all this in terms of $$\left(\frac{\partial c_m}{\partial x}\right)_{crit} \text{ and } v_1 = \frac{P_A}{\rho a}\cos\left(\frac{x\omega}{a}\right)$$

$$J_A(x) = \frac{\Pi \delta_c}{4a} c_m (1 - \Gamma_c) \cdot \left[\frac{P_A}{\rho a}\right]^2 \cos^2\left(\frac{x\omega}{a}\right), \text{ where} \quad [\text{EQ. 20}]$$

$$\Gamma_c = \frac{\left(\frac{\partial c_m}{\partial x}\right)}{\left(\frac{\partial c_m}{\partial x}\right)_{crit}} \quad [\text{EQ. 21}]$$

While the power needed per unit mass transported per unit length of membrane, from the lean reservoir 14 to the rich reservoir 18 is:

$$\frac{\dot{W}_2}{\hat{j}} = \omega L M a \quad [\text{EQ. 23}]$$

GLOSSARY a: speed of sound in the fluid.
$c_A$: concentration of component A
$c_m$: non oscillating concentration profile.
$c_1$: amplitude of oscillating concentration part of the concentration term
$J_A$: molar flux of component A
L: Distance between lean and rich reservoir or length of the bridge structure
P: total pressure $p_m$: mean pressure (constant)

Figure 6:
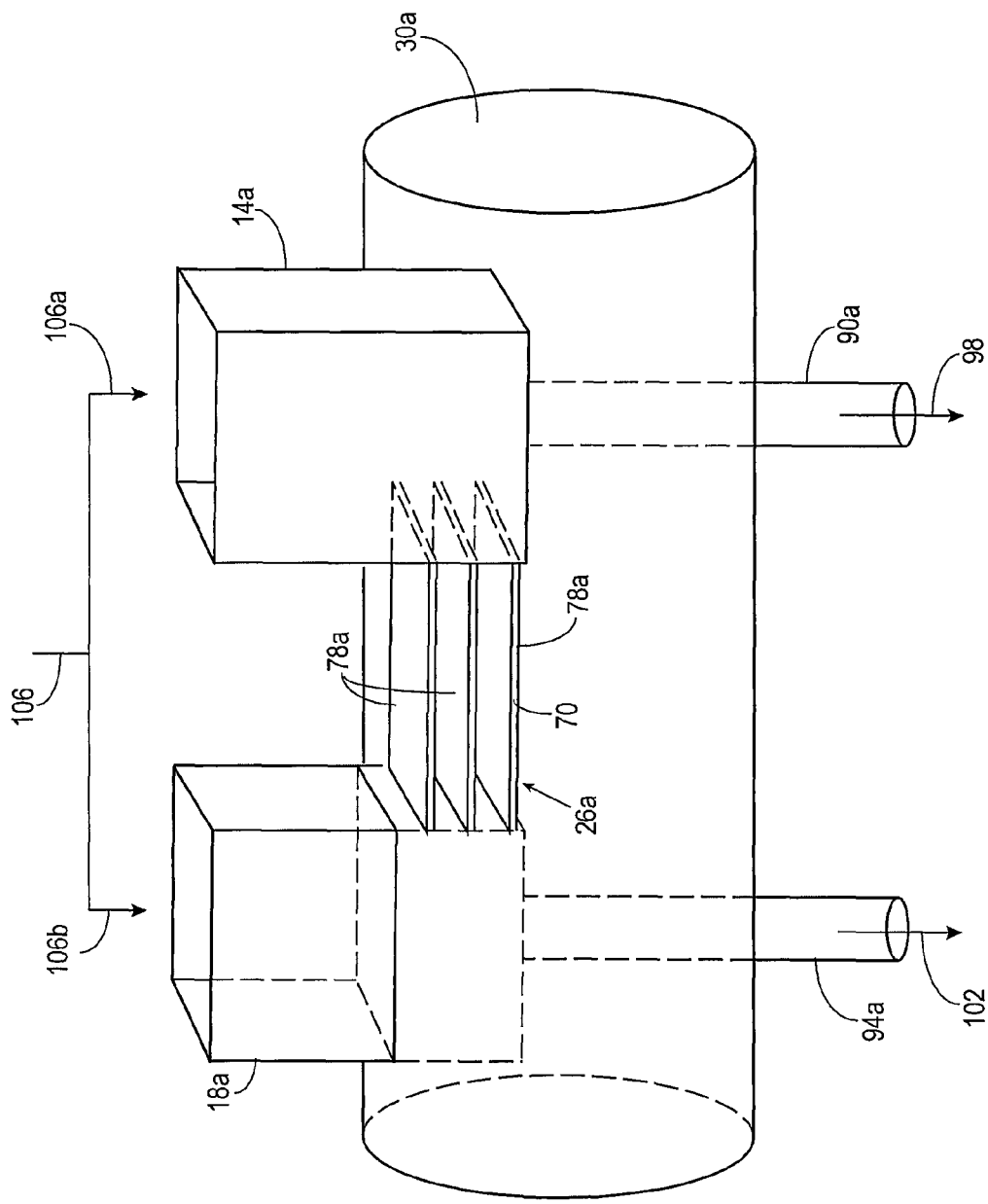
FIG. 6 is a perspective-view diagram of a second embodiment of an acoustic/pressure wave-driven device for separating a mixture into two components and which is constructed in accordance with the present invention.

$p_1$: amplitude of oscillating pressure part of the pressure term v: velocity $v_1$: amplitude of oscillating velocity part of the velocity term Greek Symbols δ: thickness of the mass transfer penetration depth $ρ_A$: molar concentration of component A Π: Cross sectional area of the gradient chamber ω: frequency Referring again to the drawings, shown in FIG. 6 is a perspective-view diagram of a second embodiment of an acoustically/pressure wave-driven separation device 10a as constructed in accordance with the present invention and referred to therein by the general reference numeral 10a. The device 10a is similar in many respects, in both form and function, to the device 10 of FIGS. 1-5G. Specifically, the device 10a is preferably provided with a lean reservoir 14a, a rich reservoir 18a, a pump reservoir 22a, a bridge structure 26a, and an acoustic/pressure wave source 30a. The lean and rich reservoirs 14a and 18a, respectively, are filled during operation with crude mixture streams 106a and 106b, respectively. Similarly, the lean and rich reservoirs 14a and 14b, respectively, are drained by lean and rich product streams 98a and 102a, respectively, via product outlets 90a and 94a, respectively.

The primary difference between the device 10a and the device 10 (FIGS. 1-3), is that the bridge structure 26a is fully submerged or within the pump reservoir 22a, and the bridge structure 26a is provided with a correspondingly different physical form. More specifically, rather than having a single diffusion portion formed of a membrane material or its functional equivalent, the bridge structure 26a is provided with a plurality of diffusion portions 78a (e.g., three), each comprising a double membrane, and each diffusion portion 78a defining a gradient channel 74a positioned between the double membranes. By way of example, the bridge structure 26a defines three gradient channels, each of which is sandwiched between two sheets of membrane material of the diffusion portion 78a, respectively, to increase the surface area available for diffusion, as described above.

The acoustic/pressure wave source 30a is provided by way of example as a vibrating membrane 30a forming a portion of the pump reservoir 22a. Although termed a vibrating "membrane," it should be understood in this context that when used as the acoustic/pressure wave source 30a, such a vibrating membrane is preferably not porous or permeable in any way. The acoustic/pressure wave source 30a may be constructed and positioned in a similar manner as the acoustic/pressure wave source 30 described above.

Figure 7:
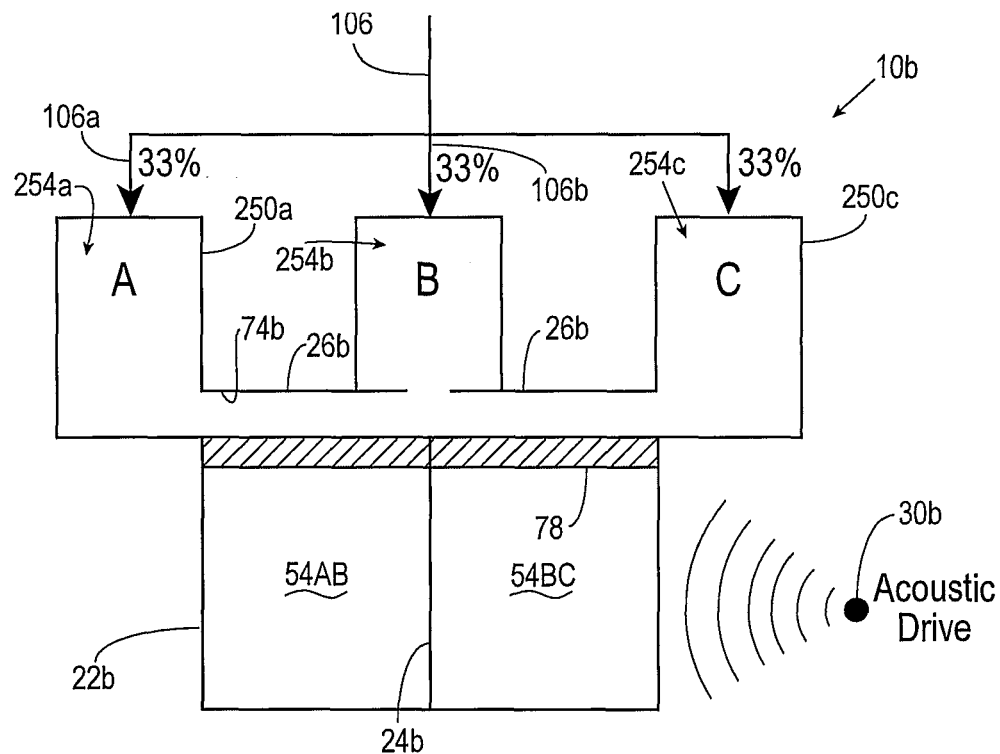
FIG. 7 is a side-view diagram of a third embodiment of an acoustic/pressure wave-driven device for separating a mixture into three components and constructed in accordance with the present invention.

Referring now to FIG. 7, shown therein is a side-view diagram of a third embodiment of an acoustic/pressure wave-driven separation device constructed in accordance with the present invention and referenced therein by general reference numeral 10b. The device 10b is adapted with three concentration reservoirs 250a, 250b, and 250c, such that the device 10b is capable of separating a crude mixture into three components and/or component mixtures or sub-mixtures. With the exception of several changes in form and the addition of an additional separation function, the device 10b is similar in many respects, in both form and function, to the device 10 of FIGS. 1-3 and the device 10a of FIG. 6. The device 10, 10a and 10b can have one or more pressure wave source(s) and one or more pump reservoir.

For example, the device 10b is provided with a plurality of concentration reservoirs, e.g. 250a, 250b, and 250c (and optionally more than three), a pump reservoir 22b, a bridge structure 26b, and an acoustic/pressure wave source 30b. The concentration reservoirs 250a, 250b, and 250c are similar in form and function to the lean and rich reservoirs 14 and 18, respectively, of the device 10 in FIGS. 1-3 and have inner spaces 254a, 254b, and 254c, respectively. However, because the device 10b is adapted to separate a crude mixture into three components A, B, and C, each concentration reservoir 250a, 250b, 250c has a relatively high concentration of its respective target component and a relatively low concentration of the other target components. For example, concentration reservoir 250a has therein a relatively high concentration of component A and relatively low concentrations of components B and C; concentration reservoir 250b has a relatively high concentration of component B and relatively low concentrations of components A and C; and concentration reservoir 250c has a relatively high concentration of component C and relatively low concentrations of components A and B. Additionally, many embodiments will have an additional fluid component in the fluid mixture to be separated to facilitate function of the device 10b, as described herein.

The bridge structure 26b is preferably formed such that a continuous gradient channel 74b is in fluid communication with each of the spaces 254a, 254b, and 254c defined by the respective concentration reservoirs 250a, 250b, and 250c. Thus, three separate concentration gradients are created within the gradient channel 74b, each with the concentration of the respective target component A, B, or C highest at a point closest to the respective concentration reservoir 250a, 250b, or 250c, and with the concentration of the respective target component A, B, or C decreasing as the distance increases from the respective reservoir 250a, 250b, 250c.

The pump reservoir 22b also includes at least one dividing wall 24b dividing the pump reservoir 22b into a first portion 54AB corresponding to the portion of the gradient channel 74b between the concentration reservoirs 250a and 250b, and a second portion 54BC corresponding to the portion of the gradient channel 74b between the concentration reservoirs 250b and 250c. Although, the dividing wall 24b is preferably included, in some embodiments, it may be reduced, perforated, omitted, or otherwise altered.

The acoustic/pressure wave source 30b is also slightly different in that the acoustic/pressure wave source 30b is depicted as spaced apart from the pump reservoir 22b. As described above, however, the acoustic/pressure wave source 30b is preferably close enough to, or otherwise disposed relative to, the pump reservoir so as to provide acoustic waves to the pump reservoir 22b. It should be understood that the acoustic/pressure waves can be introduced in a variety of manners.

In operation, the device 10b functions in a largely equivalent manner to the device 10 of FIGS. 1-3. Specifically, the acoustic/pressure wave source 30b provides acoustic/pressure waves to the pump reservoir 22b to cause pressure oscillations in a fluid within the pump reservoir 22b. Such oscillations create oscillating and alternating local concentration gradients across a diffusion portion 78b comprising a membrane material, thereby permitting the device 10b to separate a crude mixture by transporting one or more target components against their respective concentration gradients to separate the target component(s) where they can be extracted in their respective product streams (not shown) in like manner as is described above.

Figure 8:
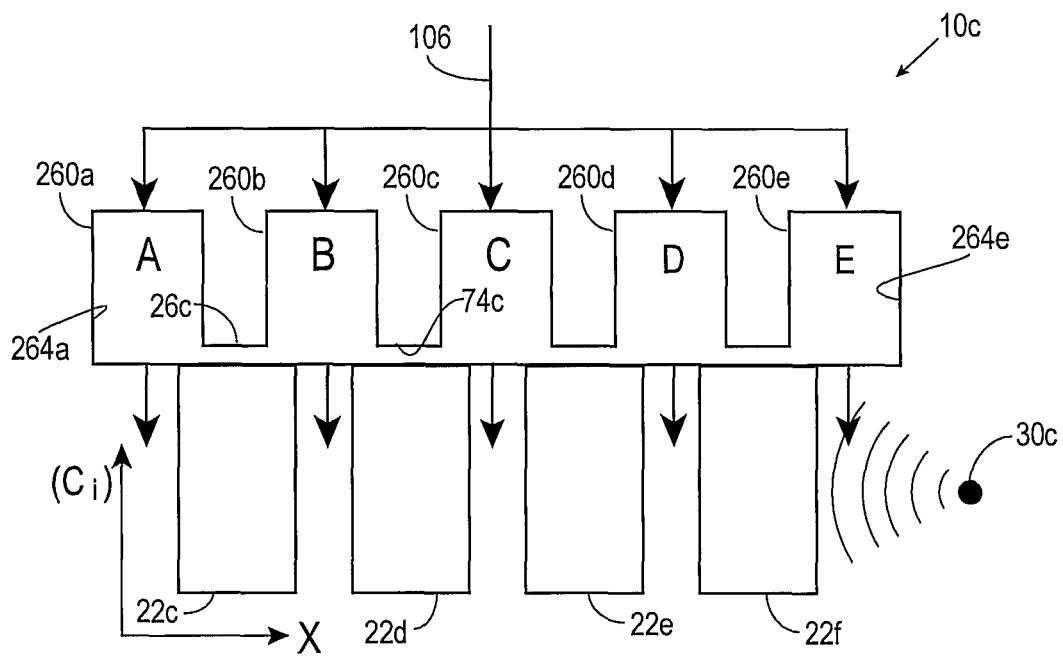
FIG. 8 is a side view diagram of a fourth embodiment of an acoustic/pressure wave-driven device for separating a mixture into five components and constructed in accordance with the present invention.

Referring now, to FIG. 8, a side view diagram of a fourth embodiment of an acoustic/pressure wave-driven device, for separating a mixture into five components, constructed in accordance with the present invention and designated by the general reference numeral 10c. Similar to the device 10b of FIG. 7, the device 10c is provided with a plurality of concentration tanks 260a, 260b, 260c, 260d, and 260e, each having an inner space 264a, 264b, 264c, 264d, and 264e, respectively. The device 10c also preferably comprises a bridge structure 26c defining a gradient channel 74c extending across and in fluid communication with each of the spaces 264a, 264b, 264c, 264d, 264e so as to permit the various target components A, B, C, D, E to maintain respective concentration gradients within the gradient channel 74c. Additionally, the device 10c is provided with at least one acoustic/pressure wave source 30c similar to the other acoustic/pressure wave sources 30-30b described elsewhere herein.

The primary difference between the device 10c and the devices 10, 10a, and 10b, is that the device 10c is provided with a plurality of pump reservoirs 22c, 22d, 22e, and 22f. As shown, each pump reservoir 22c, 22d, 22e, 22f preferably corresponds to and is disposed roughly between adjacent concentration reservoirs 260a, 260b, 260c, 260d, and 260e. For example, pump reservoir 22c corresponds (is adjacent) to concentration reservoirs 260a and 260b, pump reservoir 22d corresponds (is adjacent) to concentration reservoirs 260c and 260d, and so on. In other embodiments, the device 10c may be provided with a single pump reservoir, either with or without dividing walls (as in the device 10b of FIG. 7), or may be provided with two or more pump reservoirs, each corresponding to two or more concentration reservoirs. In operation, the device 10c operates in like fashion to the embodiments described above with reference to FIGS. 1-7. The primary feature of the device 10c is that it is adapted to separate more complex mixtures into up to five components or component mixtures. For example, the device 10c may be especially suited to the separation of petroleum mixtures into components or component mixtures, such as gasoline, diesel, propane, or the like.

In general, the present invention is directed to the use of acoustic or pressure waves to separate mixtures. However, a variety of improvements will become readily apparent upon a review of the present patent application. For example, one extension would be to add one or more reacting mixtures in a) the rich and lean reservoirs 18 and 14, b) in the pump reservoir 22, or both. In addition, if the amplitude of the pressure waves is large enough, it may enhance the chemical reaction rate since reaction rates are a function of concentration. In addition, the reaction could be occurring in a reservoir that is separate from one or more of the a) rich and lean reservoirs 18 and 14, b) or the pump reservoir 22, and the byproducts of the reaction could be supplied to the lean reservoir 14, the rich reservoir 18 or the pump reservoir 22. As another alternative, one or more semi-permeable membranes can be used to selectively allow certain chemicals to pass from the reaction to the lean reservoir 14, the rich reservoir 18 or the pump reservoir 22. The devices 10-10c described above can be used to separate the reactants from products and/or products from each other.

From the above description, it is clear that the present invention is well adapted to carry out the objects and to attain the advantages mentioned herein, as well as those inherent in the invention. While presently preferred embodiments of the invention have been described for purposes of this disclosure, it will be understood that numerous changes my be made which will readily suggest themselves to those skilled in the art and which are accomplished in the spirit of the invention disclosed and as defined in the appended claims.

What is claimed is:

1. An acoustic/pressure wave-driven device for separating a first component from a fluid mixture of the first component and a fluid second component, the device comprising:
   a rich reservoir defining a space for containing a volume of the fluid mixture having an elevated concentration of the first component;
   a lean reservoir defining a space for containing a volume of the fluid mixture having a lesser concentration of the first component that is less than the elevated concentration of the first component of the fluid mixture in the rich reservoir;
   a pump reservoir defining a space for containing a volume of a fluid mixture of the first component and the second fluid component;
   a bridge structure having at least one sidewall defining at least one gradient channel having a first end in fluid communication with the space defined by the rich reservoir, a second end in fluid communication with the space defined by the lean reservoir, and a length extending between the first end and the second end, the gradient channel for containing a volume of a fluid mixture of the first component and the second fluid component having a concentration gradient of at least the first component along the length of the gradient channel, and wherein a diffusion portion of the bridge structure is disposed between the gradient channel and the space defined by the pump reservoir and wherein the diffusion portion permits diffusion of at least the first component between the gradient channel and the space defined by the pump reservoir while substantially preventing or preventing fluid flow between the gradient channel and the space defined by the pump reservoir and isolating the gradient channel from pressure oscillations within the space of the pump reservoir; and
   an acoustic/pressure wave source in communication with the pump reservoir for providing acoustic waves into a fluid mixture within the space defined by the pump reservoir for causing pressure oscillations in the fluid mixture therein adjacent to the diffusion portion for moving molecules of the first component against the concentration gradient from the lean reservoir into the rich reservoir.

2. The acoustic/pressure wave-driven device of claim 1, wherein the diffusion portion is formed of a membrane material.

3. The acoustic/pressure wave-driven device of claim 2, wherein the membrane material is selected from the group consisting of: polymer material, latex material, a fibrous material.

4. The acoustic/pressure wave-driven device of claim 2, wherein the entire diffusion portion of the bridge structure is formed of the membrane material.

5. The acoustic/pressure wave-driven device of claim 1, wherein at least a portion of the bridge structure is disposed within the space defined by the pump reservoir.

6. The acoustic/pressure wave-driven device of claim 5, wherein the bridge structure defines a plurality of gradient channels, each gradient channel having a first end in fluid communication with the space defined by rich reservoir, a second end in fluid communication with the space defined by the lean reservoir, and a length extending between the first end and the second end, each gradient channel for containing a volume of fluid having a concentration gradient of the first component along the length of the gradient channel, and wherein the bridge structure includes at least one diffusion portion disposed between each gradient channel and the space defined by pump reservoir and wherein each diffusion portion is adapted to permit diffusion of at least the first component between the gradient channel and the space defined by the pump reservoir while preventing fluid flow between the gradient channel and the space defined by the pump reservoir.

7. The acoustic/pressure wave-driven device of claim 6, wherein at least one of the plurality of gradient channels is at least partially defined by a double membrane.

8. The acoustic/pressure wave-driven device of claim 1, wherein the acoustic/pressure wave source is selected from the group consisting of: piezoelectric elements, speakers, vibrating membranes, and a device that can introduce standing pressure waves in the pump reservoir.

9. The acoustic/pressure wave-driven device of claim 1, wherein a position of the acoustic/pressure wave device is selected from the group consisting of: in direct physical contact with the acoustically driven device, in direct physical contact with the pump reservoir, spaced apart from the pump reservoir, and within the space defined by the pump reservoir.

10. The acoustic/pressure wave-driven device of claim 1, wherein the acoustic/pressure wave source provides acoustic waves of predetermined characteristics.

11. An acoustic/pressure wave-driven device for separating at least a first component and a second component from a fluid mixture of at least the first component, the second component, and a third fluid component, the device comprising:
  a first concentration reservoir defining a space for containing a volume of fluid mixture of at least the first component, the second component, and the third fluid component, the fluid mixture having an elevated concentration of the first component and a lesser concentration of the second component;
  a second concentration reservoir defining a space for containing a volume of fluid mixture of at least the first component, the second component, and the third fluid component, the fluid mixture having a lesser concentration of the first component than the elevated concentration of the first component in the first concentration reservoir, the fluid mixture further having an elevated concentration of the second component greater than the lesser concentration of the second component in the fluid mixture of the first concentration reservoir;
  a pump reservoir defining a space for containing a volume of a fluid mixture of at least the first component, the second component, and a third fluid component;
  a bridge structure having at least one sidewall defining at least one gradient channel in fluid communication with each of the spaces defined by the first and second concentration reservoirs, and a length extending between the first and second concentration reservoirs, the gradient channel for containing a fluid having a concentration gradient of each of at the first component and the second component along the length of the gradient channel, and wherein a diffusion portion of the bridge structure is disposed between the gradient channel and the space defined by the pump reservoir and wherein the diffusion portion is adapted to permits diffusion of at least the first component and the second components between the gradient channel and the space defined by the pump reservoir while substantially preventing or preventing fluid flow between the gradient channel and the space defined by the pump reservoir and isolating the gradient channel from pressure oscillations within the space of the pump reservoir; and
  an acoustic/pressure wave source in communication with the pump reservoir for providing acoustic waves of into the fluid mixture within the space defined by the pump reservoir to cause pressure oscillations in the fluid mixture therein adjacent to the diffusion portion for moving molecules of at least the first component and the second component against their respective concentration gradients between the first concentration reservoir and the second concentration reservoir.

12. The acoustic/pressure wave-driven device of claim 11, wherein the diffusion portion is formed of a membrane material.

13. The acoustic/pressure wave-driven device of claim 12, wherein the membrane material is selected from the group consisting of: polymer material, latex material, and fibrous material.

14. The acoustic/pressure wave-driven device of claim 13, wherein the entire diffusion portion of the bridge structure is formed of a membrane material.

15. The acoustic/pressure wave-driven device of claim 11, wherein at least a portion of the bridge structure is disposed within the space defined by the pump reservoir.

16. The acoustic/pressure wave-driven device of claim 15, wherein the bridge structure defines a plurality of gradient channels, each gradient channel in fluid communication with each of the spaces defined by the first concentration reservoir and the second concentration reservoir, and a length extending between the concentration reservoirs, the gradient channel containing a fluid having a concentration gradient of each of the first component and the second component along the length of the gradient channel, and wherein a diffusion portion is disposed between the gradient channel and the space defined by the pump reservoir and wherein the diffusion portion is adapted to permit diffusion of at least the first component and the second component between the gradient channel and the space defined by the pump reservoir while preventing fluid flow between the gradient channel and the space defined by the pump reservoir and isolating the gradient channel from pressure oscillations within the space of the pump reservoir.

17. The acoustic/pressure wave-driven device of claim 16, wherein at least one of the plurality of gradient channels is at least partially defined by a double membrane.

18. The acoustic/pressure wave-driven device of claim 11, wherein the acoustic/pressure wave source is selected from the group consisting of: piezoelectric elements, speakers, and vibrating membranes.

19. The acoustic/pressure wave-driven device of claim 11, wherein the position of the acoustic/pressure wave source is selected from the group consisting of: in direct physical contact with the acoustically driven device, in direct physical contact with the pump reservoir, spaced apart from the pump reservoir, and within the space defined by the pump reservoir.

20. A method of separating a first component from a fluid mixture of the first component and a fluid second component, comprising the steps of:
  providing an acoustic/pressure wave-driven device comprising:
    a rich reservoir defining a space for containing a volume of the fluid mixture having an elevated concentration of the first component;
    a lean reservoir defining a space for containing a volume of the fluid mixture having a lesser concentration of the first component that is less than the elevated concentration of the first component of the fluid mixture in the rich reservoir;
    a pump reservoir defining a space for containing a volume of a fluid mixture of the first component and the second fluid component;

a bridge structure having at least one sidewall defining at least one gradient channel having a first end in fluid communication with the space defined by the rich reservoir, a second end in fluid communication with the space defined by the lean reservoir, and a length extending between the first end and the second end, the gradient channel for containing a volume of a fluid mixture of the first component and the second fluid component having a concentration gradient of the first component along the length of the gradient channel, and wherein a diffusion portion of the bridge structure is disposed between the gradient channel and the space defined by the pump reservoir and wherein the diffusion portion permits diffusion of at least the first component between the gradient channel and the space defined by the pump reservoir while substantially preventing or preventing fluid flow between the gradient channel and the space defined by the pump reservoir, the diffusion portion substantially isolating the gradient channel from pressure oscillations and/or flow-induced vibrations within the pump reservoir; and an acoustic/pressure wave source in communication with the pump reservoir for providing acoustic waves into a fluid mixture within the space defined by the pump reservoir for causing pressure oscillations in the fluid mixture therein adjacent to the diffusion portion for moving molecules of the first component against the concentration gradient from the lean reservoir into the rich reservoir; and adding a volume of fluid mixture to the space defined by the rich reservoir, the fluid mixture having an elevated concentration of the first component;

adding a volume of fluid mixture to the space defined by the lean reservoir, the fluid mixture having a lesser concentration of the first component that is less than the elevated concentration of the first component of the fluid mixture in the rich reservoir;

adding a volume of fluid mixture of the first component and the second fluid component to the space defined by the pump reservoir;

activating the acoustic/pressure wave source to provide acoustic waves into the space defined by the pump reservoir to establish and maintain the concentration gradient within the gradient channel.

21. The method of claim 20, further comprising the steps of:
adding additional amounts of a fluid mixture of the first component and the second fluid component to each of the lean and rich reservoirs at substantially-pre-determined rates; and
tuning the power of the acoustic waves delivered to the space defined by the pump reservoir to a level sufficient to cause the acoustic/pressure wave-driven device to separate the first component from the mixture at a rate corresponding to the substantially predetermined rates at which the fluid mixture is added.

22. The method of claim 21, wherein the steps of adding additional amounts of a fluid mixture and tuning the power of the acoustic waves are substantially simultaneous.

23. The method of claim 21, further comprising the steps of:
removing a lean product stream from the lean reservoir at a rate substantially equal to the rate at which the fluid mixture is added to the lean reservoir; and
removing a rich product stream from the rich reservoir at a rate substantially equal to the rate at which the fluid mixture is added to the rich reservoir.

24. The method of claim 23, wherein the mixture is saltwater, and wherein the lean product stream includes water having a lesser concentration of salt, and the rich product stream includes water having an elevated concentration of salt that is greater than the lesser concentration of salt in the lean product stream.

25. The method of claim 24, wherein the concentration of salt in the lean product stream is such that the state of the lean product stream is selected from the group consisting of: substantially potable for mammals, substantially potable for humans, and suitable for agricultural uses.

26. The acoustic/pressure wave-driven device of claim 1, wherein the lean reservoir and the rich reservoir further define openings to receive additional amounts of fluid mixture of the first component and the second fluid component to be separated.

27. The acoustic/pressure wave-driven device of claim 11, wherein the lean reservoir and the rich reservoir further define openings to receive additional amounts of fluid mixture of the first component the second component, and the third fluid component to be separated.

28. The method of claim 20, wherein in the step of providing an acoustic/pressure wave-driven device, the lean reservoir and the rich reservoir further define openings to receive additional amounts of fluid mixture of the first component and the second fluid component to be separated.

* * * * *